United States Patent [19]

El-Shayeb

[11] 4,452,231

[45] Jun. 5, 1984

[54] INTEGRAL SOLAR WATER HEATERS

[76] Inventor: Ahmad M. El-Shayeb, 5 Mohamad Anis St., Zamalek, Cairo, Egypt, R.C. 34643

[21] Appl. No.: 406,186

[22] Filed: Aug. 9, 1982

[51] Int. Cl.³ .............................................. F24J 3/02
[52] U.S. Cl. .................................. 126/434; 126/436; 126/447
[58] Field of Search ............... 126/434, 447, 437, 430, 126/436, 417, 450, 433, 432; 165/128, 129, 130, 131

[56] References Cited

U.S. PATENT DOCUMENTS

| 2,311,579 | 2/1943 | Scott | 126/434 |
|---|---|---|---|
| 2,388,940 | 11/1945 | Taylor | 126/434 |
| 3,987,782 | 10/1976 | Meier | 126/434 |
| 4,003,367 | 1/1977 | Wikholm | 126/434 |
| 4,064,866 | 12/1977 | Knight | 126/447 |
| 4,084,574 | 4/1978 | Golay | 126/447 |
| 4,183,350 | 1/1980 | Staudacher | 126/430 |
| 4,213,448 | 7/1980 | Hebert | 126/434 |
| 4,294,229 | 10/1981 | Maloney | 126/434 |
| 4,346,693 | 8/1982 | Wagner | 126/434 |
| 4,350,145 | 9/1982 | Bianchini | 126/434 |

FOREIGN PATENT DOCUMENTS 56-10652  2/1981  Japan .................................. 126/434

Primary Examiner—Daniel J. O'Connor

Attorney, Agent, or Firm—Arthur L. Plevy

[57] ABSTRACT

A solar water heating apparatus comprises a plurality of longitudinal tubular storage tanks positioned adjacent one another in a stacked array. Each tank is aligned adjacent the next tank in the same direction and plane. A cold water inlet pipe is directed through coaxial apertures near the bottom of each tank while a hot water outlet pipe is directed through aligned apertures near the top of each tank. Each tank in the array is associated with a heat conducting plate with each plate having a pipe thermally connected thereto. The pipe enters the associated tank at the bottom end through a first opening and enters at the top end through a second opening. The second opening at the top end is covered by a counter balanced valve member which is pivotally mounted to the tank and is operative to block the second opening for pressures below a given pressure. Hence when cold water is directed through the cold water inlet pipe, it enters the pipe associated with the plate. As the solar energy impinges on the plate, the water is heated and the pressure causes the water to rise through the pipe towards the top opening. When a particular pressure is reached due to temperature the valve will pivot and open thus causing the heated water to continue to circulate until the entire temperature of the storage tank reaches an ambient value. The valve prevents the water from cooling as during the night time.

9 Claims, 10 Drawing Figures

INTEGRAL SOLAR WATER HEATERS

BACKGROUND OF THE INVENTION

This invention relates to a water heating system or apparatus and more particularly to a solar water heating apparatus wherein water acts as a heat transferring medium.

The prior art has a plethora of patents and references which depict solar water heating systems of all different types and characteristics. As one can ascertain, such heaters are widely used throughout the world especially in areas that receive a great deal of sunshine. In the use of such heaters one can obtain a considerable savings in utility costs due to the fact that once the heater is installed the energy from the sun is used to heat the water thus eliminating the cost of fuel. As indicated many patents exist which show solar heaters of various sorts and types.

U.S. Pat. No. 2,388,940 entitled SOLAR HEATER issued to R. H. Taylor on Nov. 13, 1945. This patent shows a solar heater which has two compartments or chambers. In one chamber the water is subjected to the rays of the sun and when it becomes heated the water circulates through both compartments. After cooling, the direction of circulation changes.

U.S. Pat. No. 3,987,782 entitled SOLAR HEAT HOLDER issued on Oct. 26, 1976 to Herman Meier, Jr. This patent shows a solar heat holder for thin film heating of water in a tank. In this patent solar energy passes through a glass cover and is absorbed by a surface. The surface is in contact with a heat transfer fluid which fluid heats and gives up its heat to a fluid flowing through a heat exchanger. The patent shows a typical structural configuration which is of the type widely employed in solar heating systems.

U.S. Pat. No. 4,003,367 entitled STORAGE TYPE SOLAR WATER HEATER issued to I. V. Wikholm on Jan. 18, 1977. This patent again shows a solar water heater which has a unitary housing structure. The patent uses a siphon to control the flow of fluid between two compartments, one compartment having a smaller volume than the other compartment.

U.S. Pat. No. 4,050,508 entitled CONTROLLABLE HEAT TRANSMISSION PANELS issued on Sept. 27, 1977 to B. S. Buckley. This patent describes a heat panel which uses temperature changes to control the flow of heat between two regions. A fluid is in thermal contact with both regions and varies its heat transfer in response to the temperature of one or both of the regions.

Other patents such as U.S. Pat. No. 4,192,290 entitled COBMINED SOLAR COLLECTOR AND ENERGY STORAGE SYSTEM issued on Mar. 11, 1980 to R. N. Jensen and U.S. Pat. No. 4,258,701 entitled SOLAR COLLECTOR PANEL issued to B. S. Buckley on Mar. 31, 1981, depict various types of solar collectors which employ insulation panels in conjunction with other solar collecting structures. These panels provide mechanical means or others means to heat the water in a predetermined manner and therefore to attempt to achieve a more efficient operation.

In any event, in view of such apparatus and other apparatus, it is an object of the present invention to provide an improved solar water heater which employs a collector and storage tank integrated in a single container. It is still a further object to this invention to provide a simple and compact structure which is economical to manufacture and easy to install and operate. The structure to be described has distinct advantages over the prior art and is capable of high efficiency, with a relatively simple and economical structure.

BRIEF DESCRIPTION OF THE PREFERRED EMBODIMENT

A solar water heating apparatus comprising a plurality of longitudinal tubular storage tanks positioned adjacent one another in a stacked array, a cold water inlet pipe directed through each tank nearest the bottom end, a hot water outlet pipe directed through each tank nearest the top end, a heat conducting plate associated with each tubular member each plate having a pipe in thermal contact therewith, with said pipe having a first opening directed into the bottom of said associated tubular member and a second opening directed into the top of said tubular member, a counter balanced valve member coupled to said storage tank and operative to block said second opening for pressures below a given pressure whereby water flows via said pipe only from said first opening to said second opening to open said valve for said given pressure as dependent upon the heat rise of said heat conducting plates and therefore said associated pipes.

DETAILED DESCRIPTION OF THE INVENTION

Figure 1:
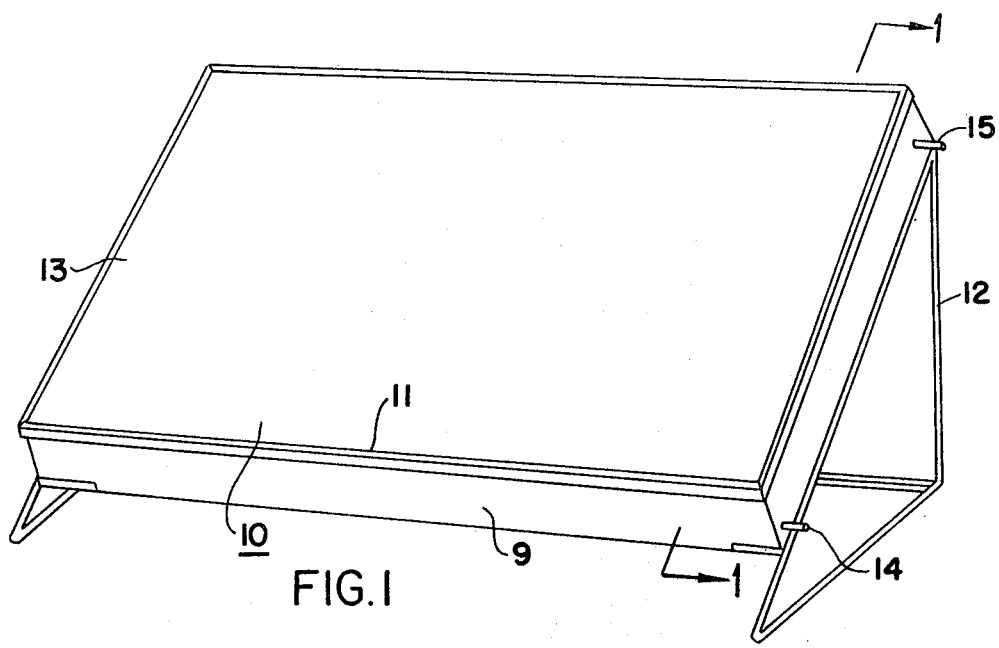
FIG. 1 is a perspective plan view of the solar heater according to this invention.

Referring to FIG. 1, there is shown a solar water heating apparatus 10 according to this invention. Essentially, the apparatus consists of a rectangular member or container 9 mounted on an angled frame 12. The mounting frame 12 is preferably made of a non-corrosive material such as steel or cast iron and maintains the container 9 at an angle of about 45°. This is a convenient angle to enable the apparatus to gain full advantage of the rays of the sun during the course of a day. The container 9 is covered by a thin glass window or sheet 13. The glass sheet 13 is secured to the top surface of the container by means of the frame 11 which is a picture like frame of an "L" shaped cross-section. As will be seen, the frame 11 holds the sheet 13 by means of rubber or elastomeric gaskets (33 & 34 of FIG. 8).

Also shown in FIG. 1 is an inlet pipe 14 and an outlet pipe 15. As will be explained, the inlet pipe 14 is secured to a source of cold water, while the outlet pipe 15 is directed to the hot water line.

Figure 2:
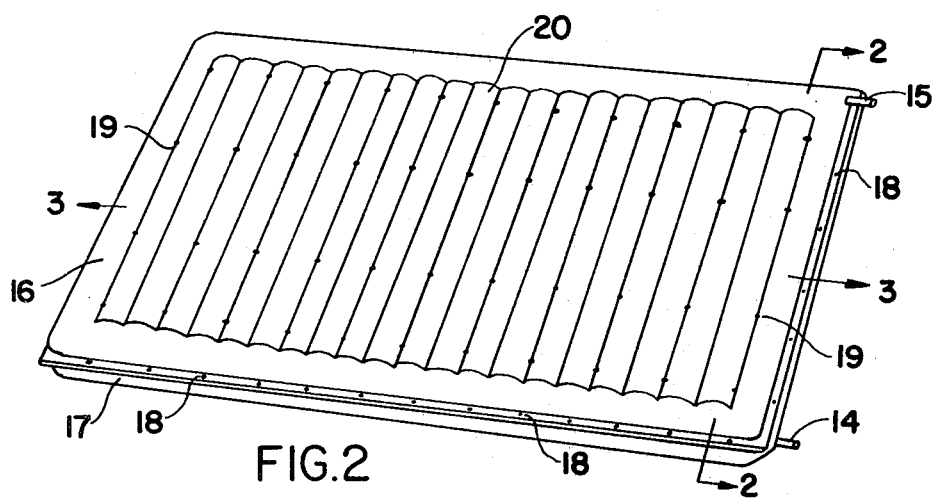
FIG. 2 is a perspective plan view of the storage tank according to this invention.

Referring to FIG. 2, underlying the glass sheet 13 is a storage tank 20. The tank 20 may be fabricated from a galvanized steel or some other non-corrosive material such as fiber glass. The tank 20 comprises a series of adjacent cylinders which are constructed in two halves. A top half 16 and a bottom half 17 are secured together to form the cylindrical structure as shown in cross-section in FIG. 4.

Figure 4:
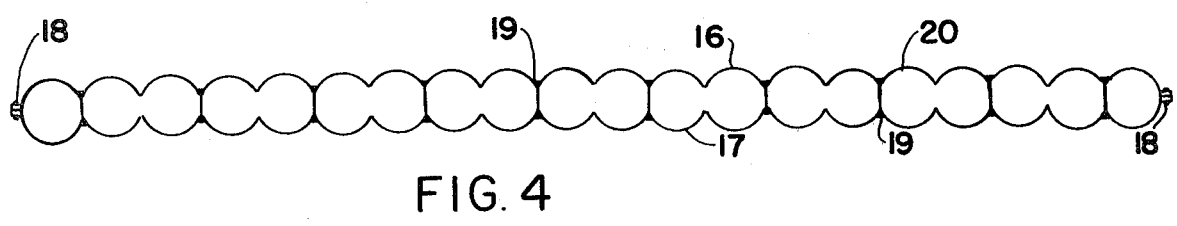
FIG. 4 is a cross-sectional view taken through line 3—3 of FIG. 2.

As seen in FIGS. 2 and 4, the unit consists of twenty cylindrical or tubular members which are formed by a corrugated top plate 16 and a corrugated bottom plate 17. It is of course understood that more or less members may be employed depending upon a particular application. As indicated, the two halves 16 and 17 are secured together by a typical adhesive such as a heat resistance epoxy or some other conventional adhesive. The units are also held together by bolts which are affixed at the center point of the two halves to strengthen the same against the pressures developed by the unit during the heating process. The locations of the bolts 19 are shown in FIGS. 2 and 4.

Figure 8:
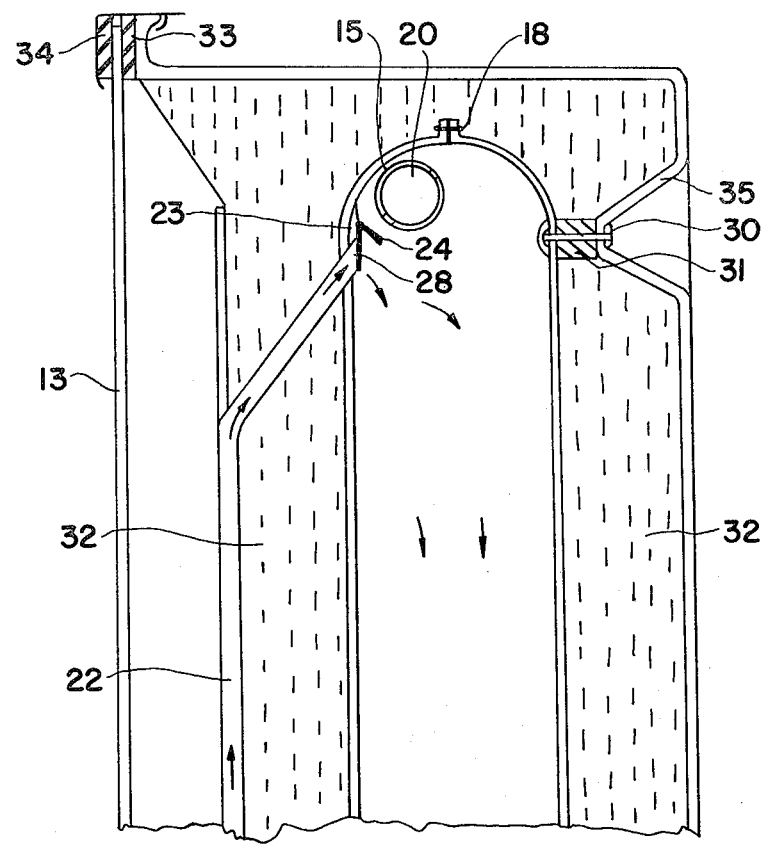
FIG. 8 is a cross-section of the entire apparatus taken through line 1—1 of FIG. 1.
Figure 8:
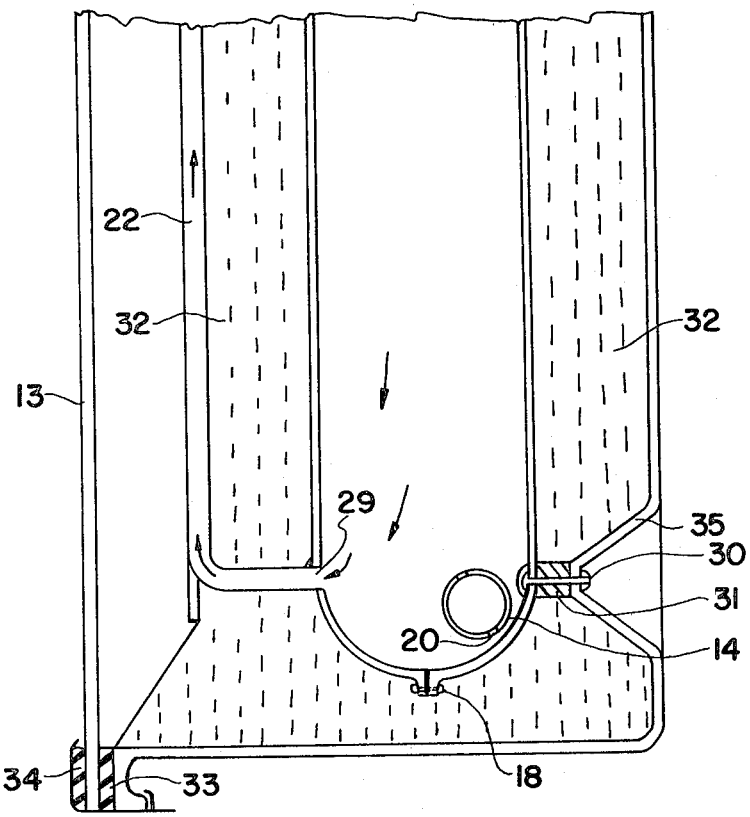

The tank or storage member 20 is insulated throughout by a polyurethane foam 32 as shown in FIG. 8 or some other suitable type of insulation. A foam member 31, as shown in FIG. 8 serves to cushion the storage tank and to position the tank a predetermined distance from the top surface of the container.

Figure 3:
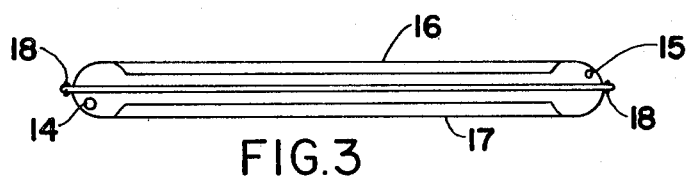
FIG. 3 is a partial cross-sectional view taken through line 2—2 of FIG. 2.

In FIG. 3, one sees a single cylindrical member formed by a top half 16 and the bottom half 17 and also showing the apertures for the inlet and outlet pipes.

Figure 5:
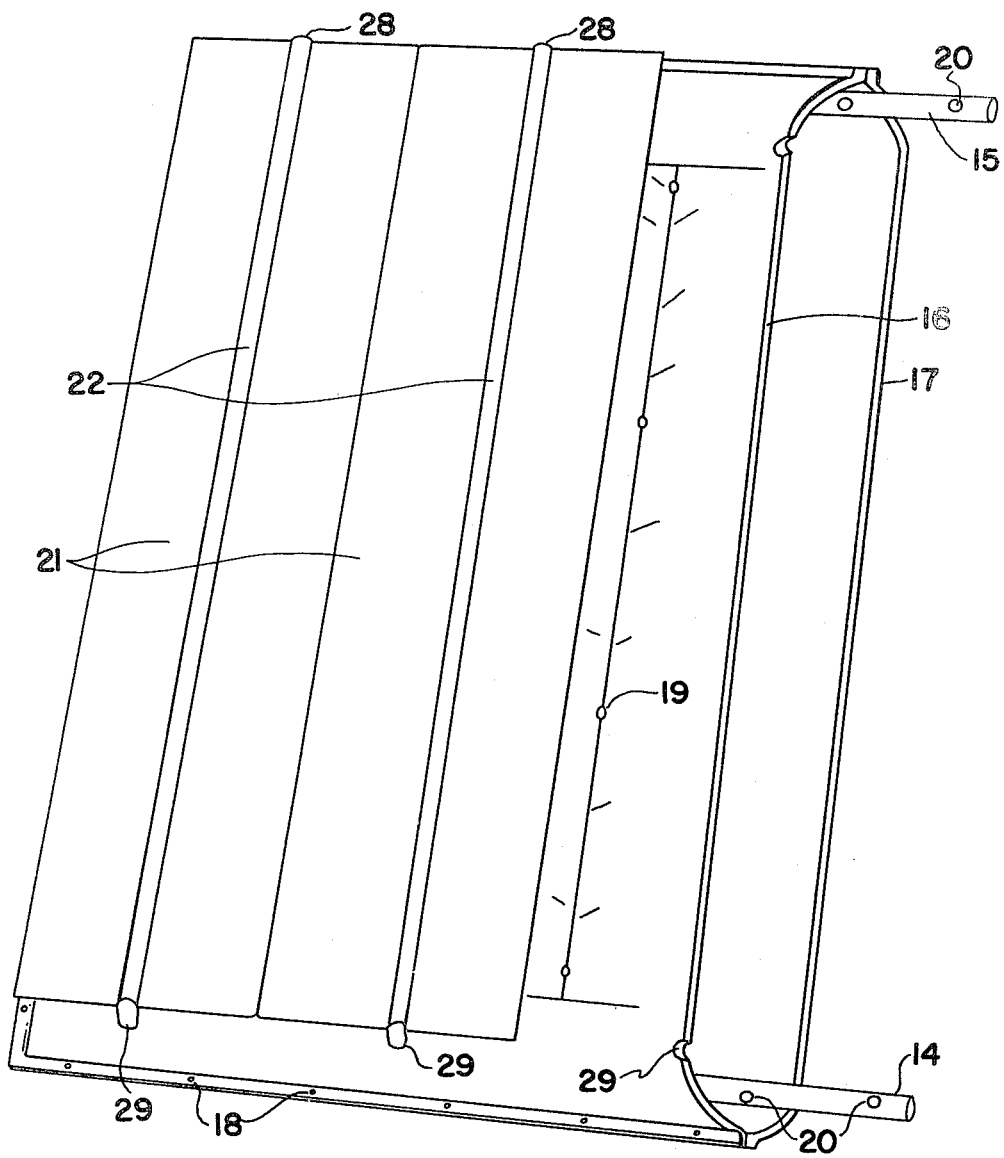
FIG. 5 is a plan view partly in partial section necessary to show the relationship of the collector and the storage tank.

Referring to FIG. 5, it is seen that the upper half 16 of the storage tank 20 is covered by a collector member 21. The collector member is fabricated from aluminum or copper. The member 21 contains a series of plates having in the center of each plate a pipe 22. The pipe 22 may be welded or soldered to the plate or may be fabricated with the plate. The pipes 22 have a lower opening 29 and an upper opening 28.

In FIG. 5, there is shown the inlet pipe 14 which is directed through the storage tank as is the outlet pipe 15. Both pipes have a series of apertures 20 along the length. The apertures are positioned to control the entrance and exit of water through the length of the tank and based on the circulation pattern of the water as it travels or moves through the apparatus.

Referring to FIG. 8, there is shown a cross-sectional view of the apparatus. In FIG. 8, the arrows represent the direction of water flow in the apparatus. Cold water entering pipe 14 is discharged through the apertures 20 and fills the bottom of the tank. The cold water enters the openings 29 and pipes 22. As indicated, the pipes 22 are thermally secured to the plates 21 via a weld or some other good heat conducting bond. As the plates and therefore the pipes heat up, the water temperature increases and the temperature of the water in the pipes is raised. As is known, the density of the water decreases as it is tending to turn to steam. When this occurs the pressure increases and as the water rises in the pipe 22 the pressure is sufficient to actuate or open the valve 23 by pushing against the diaphragm portion of the valve. The hot water concentrates or is positioned at the upper part of the tank and enters the apertures 20 of the outlet pipe 15 which directs hot water to the user. The water continues to circulate until all the water in the tank reaches a maximum temperature depending upon the temperature of the environment. In this manner, each plate 21 serves to heat the water which is flowing in the pipe 22 associated with that plate. Therefore each plate and each pipe acts as an individual unit. For example, in the case of 20 tubular members there would be 20 plates and 20 pipes. In this manner, each member accounts for 1/20th of the total capacity of the tank in the horizontal position of the apparatus and about 1/10th of the total capacity of the tank in the vertical position.

Figure 7:
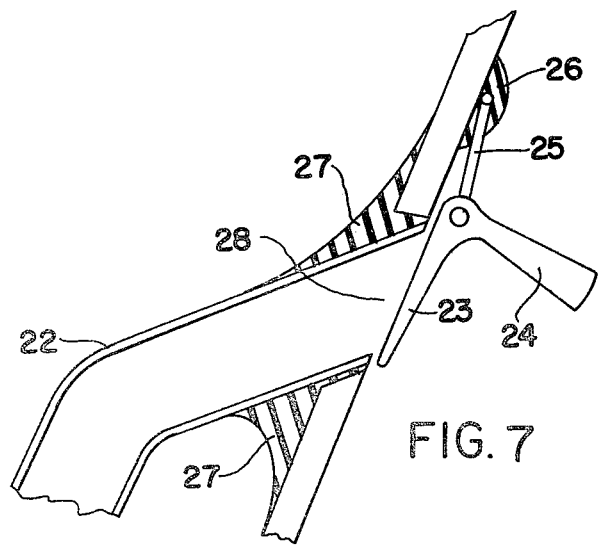
FIG. 7 is a diagramatic view showing the valve member secured to the storage tank.
Figure 6:
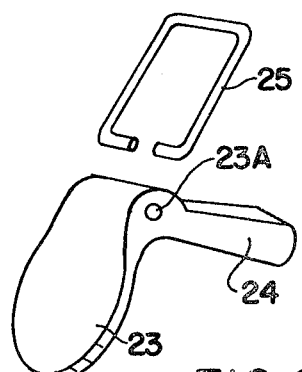
FIG. 6 is a plan view of a valve member and a clip used in this invention.

Referring to FIGS. 6 and 7, there is shown detailed drawings depicting the valve mechanism as shown in FIG. 8. The valve contains a diaphragm portion 23 which is integrally formed with a stem portion 24. There is an aperture 23A between the stem and the diaphragm portion which are transverse to each other at an angle of about 90°. The clip 25 secures the valve adjacent to the opening 28 in a pipe 22. The clip 25 serves to pivotally mount the valve as shown in FIG. 7. The stem 24 acts as a counter balance which keeps the diaphragm 23 blocking the opening 28 until a predetermined pressure exists. The function of the valve 23 is to maintain the direction of the water flow as shown in FIG. 8 and therefore to maintain water flow in a single direction. These valves are essential to prevent the water in the tank from reversing its flow direction at night. If this were allowed to occur the reverse flow would actually cool the tank. Therefore when the pressure reduces as the water gets cold, there is not a sufficient pressure to open the valve. As seen, the valve member is extremely simple and each valve can be fabricated from either copper or plastic and can be simply and easily constructed as shown and is of an "L" shaped configuration.

Figure 9A:
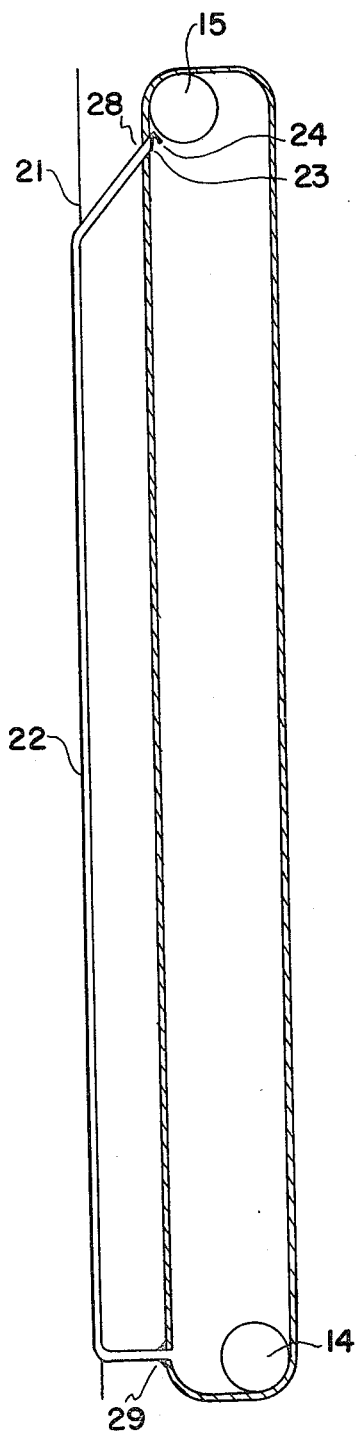
FIG. 9A shows a side cross-sectional view of the central portion of a storage tank.

In FIG. 9A, there is shown the pipe 22 coupled to a storage tubular member. The inlet and outlet pipes are also shown.

Figure 9B:
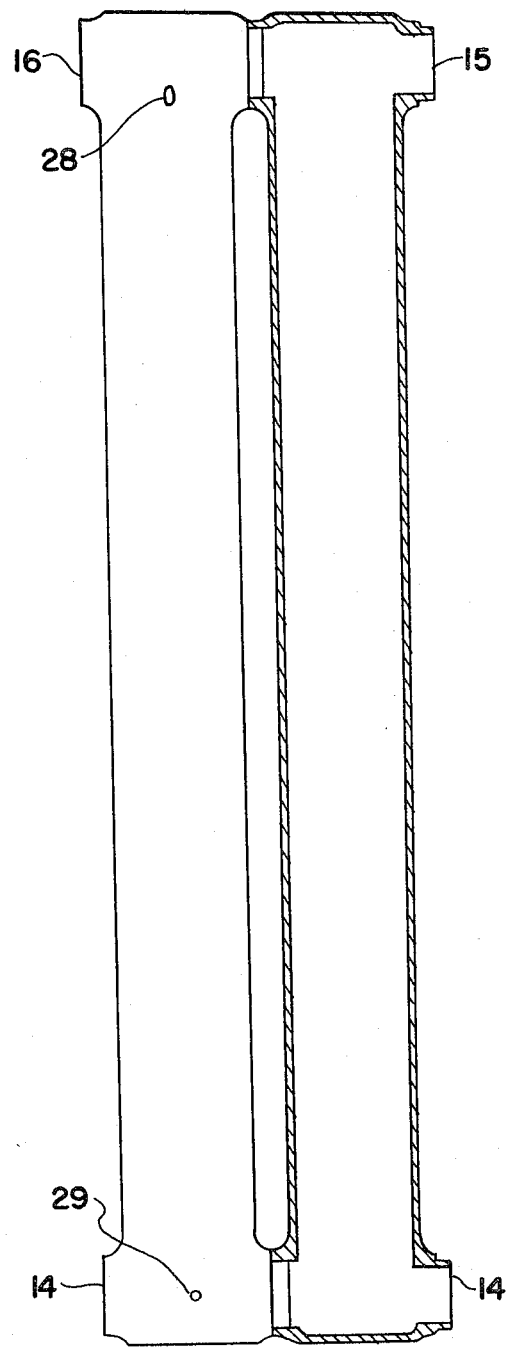
FIG. 9B shows a front view of the apparatus depicted in FIG. 9A.

In FIG. 9B, the openings 28 and 29 are depicted. FIG. 9B shows how the compartment can be fabricated from a single member and then folded to provide the composite tubular member. It is therefore understood that each of the tubular members may be constructed from a form as shown in FIG. 9B and then connected together through the inlet and outlet pipe apertures 14 and 15.

As indicated, there is absolutely no reason that the tanks have to be made from a heat conducting material and preferably the tanks are made from a plastic material in an injection molding process or other system. Each tank can accomodate six liters of water and are fixed to each other through the apertures which accomodate the pipes 14 and 15. Each aperture is then closed by means of a suitable adhesive to make a composite member.

A unit such as shown in FIGS. 1 and 3 has been constructed. The unit yielded an average hot water temperature of 45° to 75° C. depending upon the weather and the solar intensity. The unit can be easily mounted and requires less space than typical solar water heaters now being used. Extensive tests have been conducted by the National Research Center of Egypt. These tests show that the unit operates extremely efficient and has been recommended for use as a domestic water heater.

I claim:

1. A solar water heating apparatus comprising:

a plurality of longitudinal tubular storage tanks positioned adjacent one another in a stacked array, a cold water inlet pipe directed through each tank nearest the bottom end, a hot water outlet pipe directed through each tank nearest the top end, a heat conducting plate associated with each tubular member each plate having a pipe in thermal contact therewith, with said pipe having a first opening directed into the bottom of said associated tubular member and a second opening directed into the top of said tubular member, a counter balanced valve member coupled to said storage tank and operative to block said second opening for pressures below a given pressure whereby water flows via said pipe only from said first opening to said second opening to open said valve for said given pressure as dependent upon the heat rise of said heat conducting plates and therefore said associated pipes, said counter balanced valve member comprises an "L" shaped member having a diaphragm section for covering said second opening and forming one half of said "L" with a stem member depending therefrom forming the other half of said "L", with a pivot point located at the base of said "L" and means for pivotally mounting said valve member to said storage tank.

2. The solar water heating apparatus according to claim 1, wherein said inlet and outlet pipes have a series of apertures spaced along the surface thereof to accomodate water flow.

3. The solar water heating apparatus according to claim 1 including a thin layer of glass positioned above each of said heat conducting plates.

4. The solar water heating apparatus according to claim 1, wherein said heat conducting plate is positioned above said associated tubular member and insulated therefrom.

5. The solar water heating apparatus according to claim 1, wherein said pipe is welded to said plate.

6. The solar water heating apparatus according to claim 1, wherein said pipe is soldered to said plate.

7. The solar water heating apparatus according to claim 1, wherein said plates and pipes are fabricated from a good conducting metal, with said tubular members fabricated from an insulator material such as a plastic.

8. The solar water heating apparatus according to claim 1, wherein said tubular members consist of a top and a bottom section centrally secured to form said tubular member.

9. The solar water heating apparatus according to claim 1, further including holding means for holding said heating apparatus at a fixed angle to allow solar energy to impinge upon said heat conducting plates.

* * * * *